(12) United States Patent
Jain et al.

(10) Patent No.: US 6,434,114 B1
(45) Date of Patent: Aug. 13, 2002

(54) ENHANCING THE INTELLIGENT SERVICE CAPABILITY OF A NETWORK AFTER A DATA FLOW HAS BEEN ESTABLISHED

(75) Inventors: Ajay K. Jain, Holmdel; Anurag S. Maunder, Scotch Plains, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/031,017

(22) Filed: Feb. 26, 1998

(51) Int. Cl.[7] .............................................. G01R 31/08
(52) U.S. Cl. ........................................ 370/230; 370/235
(58) Field of Search ................................. 370/229, 231, 370/232, 235, 236, 237, 238, 443, 400, 230; 348/212

(56) References Cited

U.S. PATENT DOCUMENTS

| | | | | | |
|---|---|---|---|---|---|
| 4,799,215 A | * | 1/1989 | Suzuki | ........................ | 370/227 |
| 5,235,599 A | * | 8/1993 | Nishimura et al. | ............ | 714/4 |
| 5,687,167 A | * | 11/1997 | Bertin et al. | ................ | 370/254 |
| 5,878,029 A | * | 3/1999 | Hasegawa et al. | .......... | 370/236 |
| 5,896,411 A | * | 4/1999 | Ali et al. | .................... | 375/200 |
| 6,018,518 A | * | 1/2000 | Smallwood et al. | ........ | 370/235 |
| 6,084,631 A | * | 7/2000 | Tonkin et al. | ............... | 348/212 |
| 6,094,431 A | * | 7/2000 | Yamato et al. | .............. | 370/395 |
| 6,097,722 A | * | 8/2000 | Graham et al. | ............. | 370/395 |

* cited by examiner

Primary Examiner—Wellington Chin
Assistant Examiner—Brenda Pham

(57) ABSTRACT

A method for increasing the capability of the network to provide intelligent services can be accessed by any flow and allows the flow to install the services specific features to the flow. The present invention allows the software agents to be dynamically loaded into the network component to provide the services desired by the user. The present invention provides a detector in a switch in the network processing the flow that detects the presence of a predetermined control packet in the flow, and upon detection of this control packet, the detector loads a particular software object from a library of objects into the switch or router, which software object is then immediately executed by the switch to process the flow. This enables the user of the switch to request additional service from the switch after the data flow has been initiated, or to modify the flow parameters in a seamless manner.

26 Claims, 1 Drawing Sheet

ENHANCING THE INTELLIGENT SERVICE CAPABILITY OF A NETWORK AFTER A DATA FLOW HAS BEEN ESTABLISHED

BACKGROUND OF THE INVENTION

The present invention relates generally to methods and apparatuses for operating telephone or data networks, and more particularly to a method and apparatus for operating a telephone or data network to enable modification of the parameters of a particular data flow while the data flow is in progress.

Under existing network processing routines, when a user places a call to the switch, or a data flow is established, the parameters of the data flow are established during call setup, such as bandwidth, resolution, etc. (As used herein, "flow" constitutes a data stream between two endpoints, any time after the call setup.) Once established, these parameters are not variable. To modify the parameters of a connection, the user must disconnect, establish contact with the network again and negotiate the revised parameters during call setup.

Normally, this is not a problem. However, as many users can attest, one can experience large delays when downloading a particularly large data file from the Internet. In some cases, users would be willing to pay a premium to reduce this delay. Unfortunately, it is not possible to enable these users to indicate their desire to the network and for the network to act on this desire once the flow has begun, unless the user disconnects, and reconnects to establish new flow parameters, which is very inefficient.

Another example occurs when a user would like to increase the resolution of a video conferencing call after the call has been initiated. Often, the resolution is sufficient for depicting who is at the other end of the call; however, such images are insufficient for displaying on a projector. If one wanted to increase the resolution only for the period when the images being displayed were being discussed, one could not do so under existing network operating routines.

The present invention is therefore directed to the problem of developing a method and apparatus for enabling a user to specify and modify the parameters of a flow after the flow has begun without requiring interruption of the flow.

SUMMARY OF THE INVENTION

The present invention solves this problem by providing a detector, in a switch in the network processing the flow and which detects the presence of a predetermined control packet in the flow. Upon detection of this control packet, the detector loads a particular software object from a library of objects into the switch or router. The software object is then immediately executed by the switch to process the flow. By loading the software object in the switch, a user of the switch is now permitted to request additional services from the switch after the data flow has been initiated, or to modify the flow parameters in a seamless manner.

According to the present invention, a method for processing a flow includes the steps of: (a) attaching a control packet to the flow, which control packet includes an instruction regarding a characteristic of the flow; (b) detecting the control packet in the flow in a network processing the flow; and (c) controlling the flow in the network based on the instruction in the control packet to obtain the desired characteristic.

An advantageous embodiment of the above method of the present invention further includes the steps of: (d) downloading a software object from a library of objects to a switch in the network based on the control packet; and (e) executing the software object in the switch to obtain the desired characteristic.

Another advantageous embodiment of the above method of the present invention further includes the step of transmitting information regarding services available at the switch to modify the flow to a user sending the flow upon detection of a predetermined control packet in the flow.

Yet another advantageous embodiment of the above method of the present invention further includes the steps of: (d) presenting a library of objects available to a user upon detection of a predetermined control packet in the flow; (e) receiving an indication from the user regarding a specific object in the library in the flow; (f) downloading the specific object in the library upon receipt of the indication from the user into a switch; and (g) executing the specific object in the switch immediately to control the flow.

Still another advantageous embodiment of the above method of the present invention includes the step of inserting a control packet in the flow at the customer premises equipment that indicates the user is requesting a listing of services available at a network switch for modifying the flow.

Another advantageous embodiment of the above method of the present invention further includes the step of transmitting a list of services available to modify the flow to the customer premises equipment upon detection of the control packet requesting the list inserted by the customer premises equipment.

More still, another advantageous embodiment of the above method of the present invention further includes the steps of: (d) routing the flow through a new route through the network based on information in the control packet; and (e) downloading user specific content/services to intermediate components of the new route dynamically without interrupting the flow.

According to the present invention, an apparatus for enabling a user to control a flow once the flow has been initiated in a network, includes a customer premises device, a detector and a processor. The customer premises device sends the flow to the network, creates a control packet including information regarding certain characteristics of the flow, and inserts the control packet into the flow. The detector is coupled to the customer premises equipment, disposed in the network, monitors the flow for the control packet, and detects the presence of the control packet. The processor is coupled to the detector, controls the flow in the network, receives an indication from the detector regarding the presence of the control packet, and executes a software routine based upon information contained in the control packet, which modifies the control of the flow in the network.

One embodiment of the above apparatus of the present invention further includes a library of software routines stored in the network, which routines are accessible by the detector and processor, and wherein a user specified software routine is downloaded into the processor and is immediately executed by the processor according to an identification of the user specified software routine included in the control packet.

Another embodiment of the above apparatus of the present invention further includes a database storing a library of software routines. The database is coupled to the detector and the processor. In this case, the detector sends a user specified software routine identification received in the control packet to the database, which downloads the user specified software routine into the processor, which routine is then immediately executed by the processor.

An alternate embodiment of the above apparatus of the present invention further includes database storing a library of software routines. The database is coupled to the detector and the processor. In this version, the detector sends a user specified software routine identification received in the control packet to the processor, which downloads and immediately executes the user specified software routine.

DETAILED DESCRIPTION

The present invention describes a method and apparatus for increasing the capability of the network to provide intelligent services, which can be accessed by any flow. It also allows the flow to install the service specific features to the flow, i.e., after call setup.

The present invention allows the software agents to be dynamically loaded into the network component and to provide the services desired by the user. These agents can either be configured by the network provider itself or by the user. In case of the latter, the agents have to be approved by the network service provider for security or performance constraints. According to the present invention, the network switch is capable of downloading and executing any software code on demand thus allowing new services to be created instantaneously.

Traditionally, the network switch (ATM or IP or any other switch) runs the software which gets upgraded in a very long time scale. Upgrading the software to introduce new services is an expensive process. By making user defined code go through a precertification process, one can avoid security breeches or any other undesired functionality.

Figure 1:
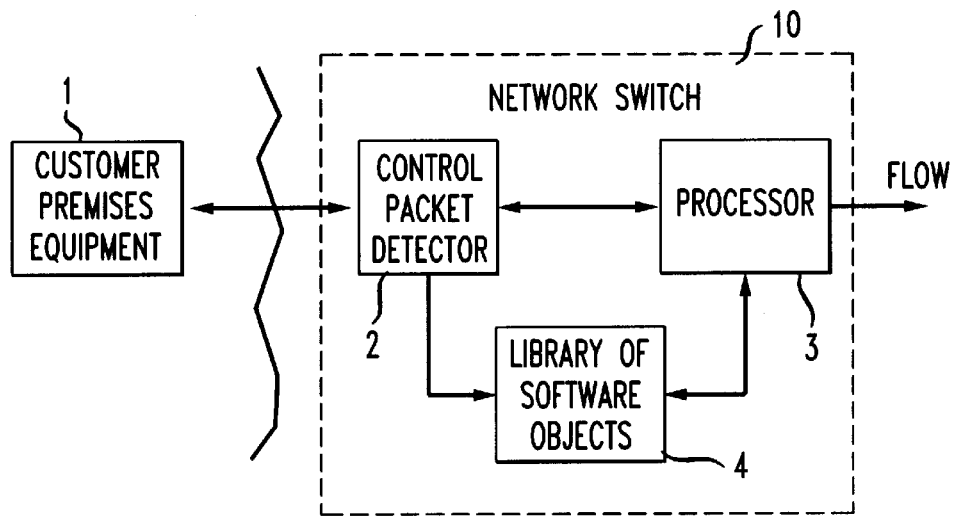
FIG. 1 depicts one embodiment of the apparatus according to the present invention.

FIG. 1 depicts one embodiment of the present invention. At the user end, the customer premises equipment 1 (CPE) initiates the connection and establishes the parameters of the flow during call setup. Once call setup is complete, if the user decides to modify the parameters of the flow, according to the present invention, the CPE I inserts a control packet, which includes information regarding the desired modifications to the flow. In addition, the control packet can simply request information from the network regarding potential options about modifying the flow.

A detector 2 in the network monitors the flow for the presence of the control packet. Upon detection of the control packet, the detector 2 decodes the information in the control packet, and sends the identity of the appropriate software object to be downloaded into the processor 3 to the library of software objects 4, if any, while passing the flow through to the processor in the normal manner.

After identification of the appropriate software object to be downloaded, the object is downloaded into the processor 3 and is executed immediately to control the flow passing through the processor. The object can either be downloaded by the processor after receiving an indication from the detector that an object is to be downloaded along with the appropriate identifier of the object, or the detector can download the object into the processor after detecting the control packet.

The detector 2 and processor 3 can be combined in a single processor, but are shown as two separate entities to indicate the functionality of the present invention.

The library of software objects consists of a database preferrably maintained in the network at the switch or router 10, although a centralized data base at a remote locator is also contemplated and within the scope of the present invention.

Figure 2:
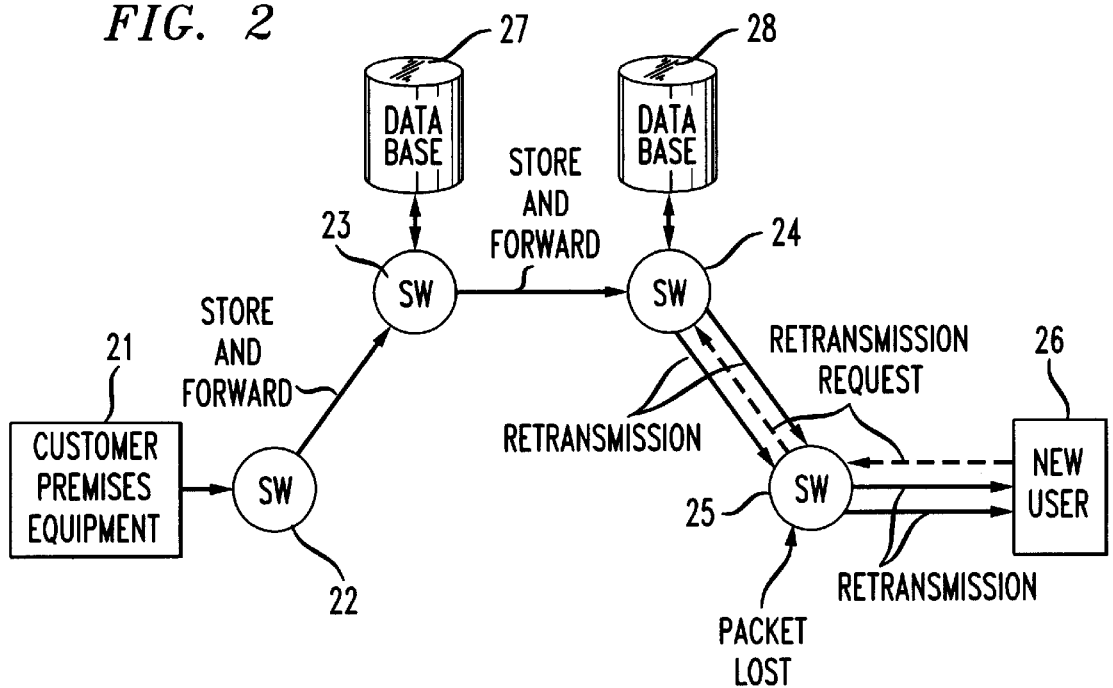
FIG. 2 depicts one application of the method according to the present invention.

The advantages of a network with such capabilities are illustrated by the following example, the implementation of one of which is shown in FIG. 2. Typically, the routing of a flow is done at the call set up time. If the service requirement of the existing flow changes, as a result of the present invention, the intelligent agent can find a new route through the network and download the user specific content/services to the intermediate components of the new route dynamically without interrupting the existing flow.

Shown in FIG. 2, the customer premise equipment (CPE) 21 transmits the flow to the originating network switch 22, which in turn transmits the flow to the first intermediate network switch 23, and so on to the second intermediate network switch 24, and the terminating network switch 25. The terminating network switch 25 transmits the flow to the end point 26. The first intermediate network switch 23 and the second intermediate network switch 24 include storage capability, i.e., databases 27, and 28.

An example of enhancing the capability of the network is the possible introduction of the content storage and retransmission capability in the intermediate network components 23, and 24. These capabilities can be used by the flows which require the same information content to be transmitted many times over (such as the output of a popular web site), which now can be retransmitted to the new user 26 from the intermediate network component 24, thereby saving valuable network bandwidth, and by some real time service to reduce the end to end delay in case the packet gets lost.

For example, once the flow has been established, if the sending user decides to initiate the store and forward capability of the network, the CPE 21 introduces a control packet in the flow with a predetermined format that indicates the user desires o enhance the capability of the flow with the store and forward feature. This control packet is detected by the originating switch 22, which activates the store and forward capability in the network. However, as the originating switch 22 does not include storage, the data is not stored there, but merely sent on.

Once the data reaches the first intermediate switch 23, the data packets are stored there in the database 27, and then forwarded to the second intermediate switch 24, where again the packets are stored in database 28 and forwarded. If a packet is lost at the terminating switch 25, which includes no storage, the packet is requested via a retransmission request sent from the end user CPE 26. The retransmission request is received at the terminating switch and sent to the closest switch with storage capability, i.e., the second intermediate switch 24 with database 28, which downloads the lost packet from the database 28 and retransmits the lost packet to the terminating switch 25, which in turn sends the lost packet to the end user CPE 26.

The example of a real time service which requires efficient retransmission is a fax service over Internet. Suppose a packet gets lost in the subsequent router or end host or even some intermediate domain which does not provide content storage capability, and then a request for retransmission is sent. When the packet corresponding to the retransmission flow-id arrives at the router that provides content storage, the router dynamically loads the search program and searches for the desired packet (or frame) in its storage disc. If the packet is available then it gets retransmitted from the router. Thus, when typically the packet would have gone to the source of the packet for retransmission and thus adding to the delay for the real time services, the intelligent router will allow retransmission at the intermediate hop thereby saving bandwidth and retransmission at the source end while reducing the end to end delay.

The content storage capability can be used by an incoming flow by using and setting the appropriate fields in the packet header. In general, we shall refer to such packet fields that identify a desired service of the flow as the service-id of the packet. The real time services which do not want the retransmission request to travel back to the source should set the service-id field of the packet such that the packet gets stored in each of the intermediate unit. If the retransmission request for that packet is not received for some delta time unit (specified either by the user or the network) then the packet is removed from the storage. The retransmission request in turn corresponds to a specific service and hence retransmission request packet should have a service id corresponding to the retransmission request. When a router sees such a packet and it provides the content storage capability then it can search for the packet in its storage box. Thus, arbitrary services can be performed at each of the router.

The real time availability for advanced processing is currently limited on each port of the router and in the router itself. According to one aspect of the present invention, there is an explicit reservation of real time in the router. It means that the real time availability is treated just like other resources in the network such as bandwidth. To ensure that these arbitrary services can be performed in reserved real time for all the flows that request such real time, the router will reserve only as much real time for the flows as is available to it. The other requests for real time reservation will be denied. Alternatively, other requests will only be given the best effort promise.

As another example, consider the request for call streaming at the selected nodes. Whenever the packets for this particular flow arrive, the service specific (or requested from the set of standard services provided by the router) to this flow is downloaded dynamically. Other examples are multicasting, and reliability etc.

Compared to existing technology, the present invention:

Introduces enhanced feature(s) and capabilities while a call is in progress.

Offers resources on demand while a connection is up.

Introduces intelligence in the switches to use the assets most efficiently.

This set of enhancements enables the customized calling experience for the customers at minimum possible cost.

The present invention algorithms and architecture enables mass customization of multimedia services while improving calling experience for both calling as well as called parties in the real time. This approach also allows creation of high-end voice/data services packages that can be marketed at a premium to both residential and business customers.

Other potential applications of the present invention include rerouting of a flow while the flow is in progress, such as to enable the flow to be sent over a transmission line that can accommodate increased bandwidth, or to avoid a specific routing for a call (such as through a country currently hostile to the calling party's country), or to add encryption before routing through a particular country.

With regard to video transmission, the present invention makes it possible to specify increased resolution for a particular segment only of the transmission, to fast forward to a part of the transmission, to pause the transmission, etc., just like a video recorder.

By activating a control packet in the flow, the user can obtain a listing of the capabilities available to the user for the particular type of data the user is sending/receiving. This enables the user to access new services as soon as they become available, even before the user might otherwise become aware of the new service.

Another example would be to increase the error correction being applied to a particularly noisy segment of the flow, but not at all of the segments to avoid increased processing by the network.

What is claimed is:

1. A method for processing a flow comprising:
   a) attaching a control packet to the flow after a connection for the flow has been established and before the connection has been terminated, which control packet includes a user-requested instruction regarding a characteristic of the flow;
   b) detecting the control packet in the flow in a network processing the flow;
   c) controlling the flow in the network based on the instruction in the control packet to obtain the desired characteristic;
   d) downloading a software object from a library of objects stored in a memory coupled to the network, the library of object comprising an application layer software object being downloaded to a switch in the network based on the control packet; and
   e) executing the software object in the switch to obtain the desired characteristic.

2. The method according to claim 1, further comprising the steps of:
   d) transmitting information regarding services available at the switch to modify the flow to a user sending the flow upon detection of a predetermined control packet in the flow.

3. The method according to claim 1, further comprising the steps of:
   d) presenting a library of objects available to a user upon detection of a predetermined control packet in the flow;
   e) receiving an indication from the user regarding a specific object in the library in the flow;
   f) downloading the specific object in the library upon receipt of the indication from the user into a switch; and
   g) executing the specific object in the switch immediately to control the flow.

4. The method according to claim 1, further comprising the step of inserting a control packet in the flow at the customer premises equipment that indicates the user is requesting a listing of services available at a network switch for modifying the flow.

5. The method according to claim 4, further comprising the step of transmitting a list of services available to modify the flow to the customer premises equipment upon detection of the control packet requesting the list inserted by the customer premises equipment.

6. The method according to claim 1, further comprising the steps of:
   d) routing the flow through a new route through the network based on information in the control packet; and
   e) downloading user specific content/services to intermediate components of the new route dynamically without interrupting the flow.

7. The method according to claim 1, further comprising the steps of introducing content storage and retransmission capability in intermediate network components according to instructions in the control packet.

8. The method according to claim 1, further comprising the step of reserving real time availability in the network based on an instruction in the control packet.

9. The method according to claim 8, further comprising the step of reserving only as much real time for the flows in each router as is available to the router, and denying all other requests for real time reservation.

10. The method according to claim 8, further comprising the step of reserving only as much real time for the flows in each router as is available to the router, and giving all other requests only a best effort promise.

11. The method according to claim 1, further comprising the step of avoiding a specific routing for the flow based on an instruction in the control packet.

12. The method according to claim 1, further comprising the step of adding encryption before routing through a particular country based on an instruction in the control packet.

13. The method according to claim 1, further comprising the step of modifying a resolution of a video transmission based on an instruction in the control packet.

14. The method according to claim 1, further comprising the step of moving to a user specified part of the video transmission based on an instruction in the control packet.

15. The method according to claim 1, further comprising the step of modifying the error correction being applied to at least one segment of the flow based on an instruction in the control packet.

16. A method for processing data passing though a network comprising the steps of:
   a) attaching a control packet to the data after a data connection has been established, which control packet includes a user-requested instruction regarding a characteristic of the data connection;
   b) detecting the control packet in the data in the network in which the data connection is established;
   c) controlling the data connection based on the instruction in the control packet to obtain the desired characteristic;
   d) downloading a software object from a library of objects stored in a memory coupled to the network, the library of object comprising an application layer, the software object downloaded to the router based on the control packet; and
   e) executing the software object in the router to obtain the desired characteristic.

17. The method according to claim 16, further comprising the steps of:
   d) transmitting information regarding services available at the router to modify the data connection to a user sending the data upon detection of a predetermined control packet in the data.

18. The method according to claim 16, further comprising the steps of:
   d) presenting a library of objects available to a user upon detection of a predetermined control packet in the data;
   e) receiving an indication from the user regarding a specific object in the library in the data;
   f) downloading the specific object in the library upon receipt of the indication from the user into a network processor; and
   g) executing the specific object in the network processor immediately to control the user's data.

19. An apparatus for enabling a user to control a flow once the flow has been initiated in a network, comprising:
   a) a customer premises device sending the flow to the network, creating a control packet including information including an instruction regarding certain characteristics of the flow, and inserting the control packet into the flow to affect a flow connection between flow initiation and termination;
   b) a detector coupled to the customer premises equipment, being disposed in the network, monitoring the flow for the control packet, and detecting the presence of the control packet;
   c) a processor being coupled to the detector, controlling the flow in the network, receiving an indication from the detector regarding the presence of the control packet, and executing a software routine based upon information contained in the control packet, which modifies the control of the flow in the network; and
   d) a library of software routines comprising an application layer stored in the network being accessible by the detector and processor,
      wherein a user specified software routine is downloaded into the processor and is immediately executed by the processor according to an identification of the user specified software routine included in the control packet.

20. The apparatus according to claim 19, further comprising a database storing a library of software routines, said database being coupled to the detector and the processor, wherein said detector sends a user specified software routine identification received in the control packet to the database, which database downloads the user specified software routine into the processor, which routine is then immediately executed by the processor.

21. The apparatus according to claim 19, further comprising a database storing a library of software routines, said database being coupled to the detector and the processor, wherein said detector sends a user specified software routine identification received in the control packet to the processor, which downloads and immediately executes the user specified software routine.

22. The apparatus according to claim 19, wherein the detector monitors the flow for the presence of the control packet, and upon detection of the control packet, the detector decodes the information in the control packet, and sends an identification of a software object to be downloaded into the processor to the library of software objects, if any, while passing the flow through to the processor in the normal manner.

23. The apparatus according to claim 19, where the detector and the processor are combined in a single processor.

24. The apparatus according to claim 19, wherein the library of software objects includes a database maintained in the network.

25. A method for processing a flow comprising:
   a) attaching a control packet to the flow after a connection for the flow has been established and before the connection has been terminated, which control packet includes an instruction regarding a characteristic of the flow;
   b) detecting the control packet in the flow in a network processing the flow;
   c) controlling the flow in the network based on the instruction in the control packet to obtain the desired characteristic;

d) downloading a software object from a library of object stored in a memory coupled to the network, the library of object comprising an application layer, the software object being downloaded to a switch in the network based on the control packet;

e) executing the software object in the switch to obtain the desired characteristic;

f) reserving real time availability in the network based on an instruction in the control packet, reserving only as much real time for the flows in each router as is available to the router; and g) denying all other requests for real time reservation.

26. A method for processing a flow comprising:

a) attaching a control packet to the flow, which control packet includes an instruction regarding a characteristic of the flow;

b) detecting the control packet in the flow in a network processing the flow;

c) controlling the flow in the network based on the instruction in the control packet to obtain the desired characteristic;

d) downloading a software object from a library of objects stored in a memory coupled to the network, the library of object comprising an application layer, the software object being downloaded to a switch in the network based on the control packet;

e) executing the software object in the switch to obtain the desired characteristic;

f) reserving real time availability in the network based on an instruction in the control packet, reserving only as much real time for the flows in each router as is available to the router; and g) giving all other requests only a best effort promise.

* * * * *